United States Patent Office 3,579,532
Patented May 18, 1971

3,579,532
BIS-PHOSPHONO-PROPIONAMIDE SUBSTITUTED ETHYLENE GLYCOLS AND IMIDAZOLIDINONES
Hermann Nachbur, Dornach, Switzerland, Bernard Peter Stark, Stapleford, Cambridge, England, and Arthur Maeder, Therwil, Switzerland, assignors to Ciba Limited, Basel, Switzerland
No Drawing. Filed July 22, 1968, Ser. No. 746,308
Claims priority, application Great Britain, July 28, 1967, 34,922/67
Int. Cl. C07d 49/34
U.S. Cl. 260—309.7            10 Claims

ABSTRACT OF THE DISCLOSURE

This invention provides phosphorus-containing products which are obtained by reacting a compound of the formula

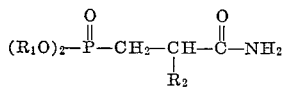

wherein $R_1$ represents a substituent bound through a carbon atom to the oxygen atom and $R_2$ e.g. a hydrogen atom or a methyl group, with glyoxal, formaldehyde, urea and an etherifying agent like a saturated or unsaturated aliphatic alcohol.

These phosphorus-containing reaction products are useful as agents for flameproofing.

---

This invention relates to phosphorus-containing reaction products, to their production, and to their use as flameproofing agents.

In particular, this invention provides phosphorus-containing reaction products from (a) at least one compound of the formula (1)

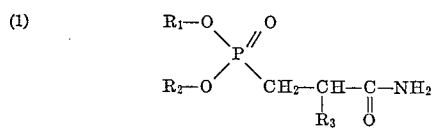

wherein $R_1$ and $R_2$ each denote a substituent bound through a carbon atom to the oxygen atom, and $R_3$ denotes a hydrogen atom or a methyl group,
(b) glyoxal
(c) formaldehyde or a substance liberating formaldehyde,
(d) if desired, urea and
(e) if desired at least one alkanol or alkenol.

Useful phosphorus-containing reaction products are made from 1 to 2 moles of component (a), 1 mole of component (b), 1 to 4 moles of component (c), 0 to 1 mole of component (d) and 0 to 4 moles of component (e).

In Formula 1 $R_1$ and $R_2$ may be the same or different. Preferably, $R_1$ and $R_2$ denote identical groups containing at most four carbon atoms each and are alkyl groups, which may be substituted by halogen, or alkenyl groups. As examples of these may be quoted n-propyl, isopropyl, and especially ethyl or methyl groups, as well as chloroalkyl groups such as 2-chloroethyl and 2,3-dichloropropyl groups, and allyl groups. $R_3$ preferably denotes a hydrogen atom.

The substance liberating formaldehyde in component (c) preferably is paraformaldehyde.

Candidates for component (e) include allyl alcohol, n-butanol, ethanol and, preferably, methanol.

The phosphorus-containing reaction products are characterized in that they are obtained by reaction of components (a) to (e) in different sequences. For instance, component (a) is first condensed with component (b), then the product is reacted with component (c), if desired reacted at the same time with component (d), and if desired finally reacted with component (e). Another possibility consists in first reacting component (b) with component (d), then with component (a), thereupon with component (c) and, if desired, finally with component (e). Further component (a) may be first reacted with component (b), and component (c) with component (d), and the two reaction products may be condensed with each other, if desired, this condensation product may finally be etherified with component (e).

The phosphorus-containing reaction products contain compounds believed to be of the formula (2)

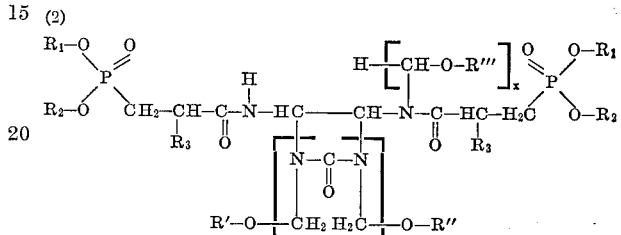

wherein $R_1$ and $R_2$ each denote a substituent bound through a carbon atom to the oxygen atom, $R'$, $R''$ and $R'''$ each denote hydrogen or an alkyl or alkenyl group, $R_3$ denotes hydrogen or methyl, and $x$ and $y$ are each 0 or 1, at least one of $x$ and $y$ being 1.

Formula 2 thus comprises the following compounds:

(A) Phosphonopropionamides of the formula ($x=1$; $y=0$)

(3)

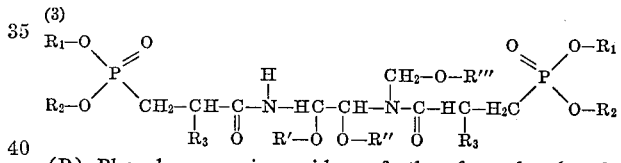

(B) Phosphonopropionamides of the formula ($x=0$; $y=1$)

(4)

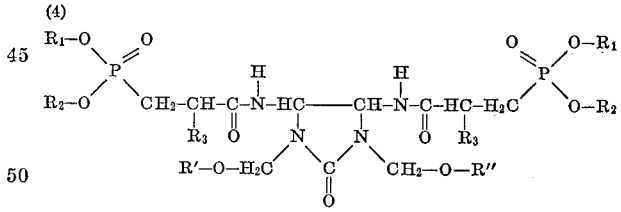

(C) Phosphonopropionamides of the formula ($x=1$; $y=1$)

(5)

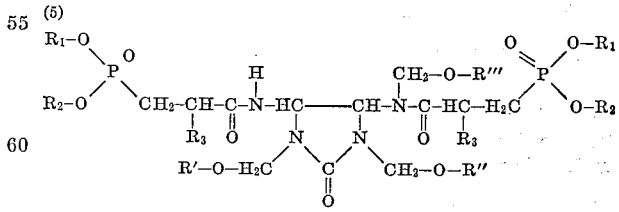

In Formulae 3, 4 and 5, $R_1$ $R_2$, $R_3$, $R'$, $R''$ and $R'''$ have the same meanings as in Formula 2, $R_1$, $R_2$ and $R_3$ may have the same preferred meanings as given for component (a).

The group $R'$, $R''$ and $R'''$ in the compounds of Formulae 3, 4 and 5 may, as already stated, be the same or different. Thus, the compounds of Formulae 3, 4, or 5 may have, as appropriate, two or three identical groups attached to the —$CH_2$—O— groups, such as alkyl groups containing 1 to 4 carbon atoms each, for example n-butyl, ethyl or methyl groups, and also allyl groups. Especially preferred, however, are the phosphonopropionamides of Formulae 2 to 5 with unetherified or with methanol-etherified hydroxymethyl groups, i.e. R', R" and R''' each denote hydrogen or a methyl group.

In addition to the compounds of Formulae 3, 4 and 5, the phosphorus-containing reaction products also contain compounds which probably correspond to these formulae:

(6)

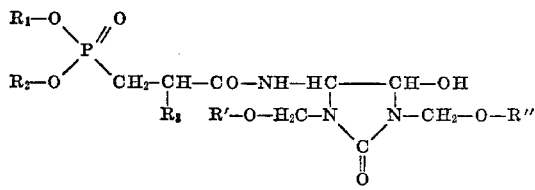

(7)

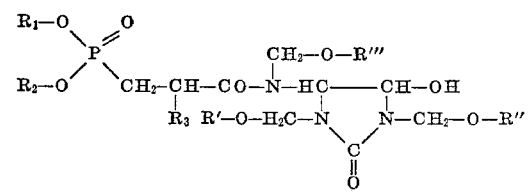

The phosphorus-containing reaction products further always contain some mono- or dimethylol compounds of the phosphonopropionamides of the Formula 1 which may be etherified.

The compounds of Formula 2 can be prepared by conventional methods. Thus, compounds of Formula 3 are obtained by reaction of a compound of formula (8)

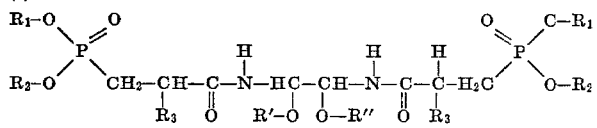

where $R_1$, $R_2$, $R_3$, R' and R" have the meaning previously assigned, with formaldehyde or a substance liberating formaldehyde, and etherification if required of the resultant methylol compound. More particularly, by treatment of compounds having the formula (9)

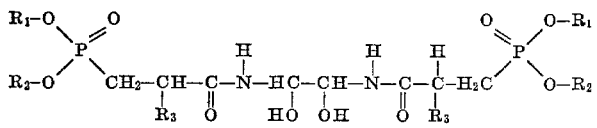

with formaldehyde in an aqueous, weakly alkaline medium, methylol compounds of formula (10)

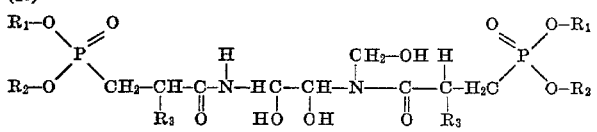

are produced. The starting materials, the compounds of Formula 9 are conveniently obtained by reaction of the amides of formula (11)

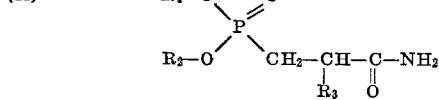

with glyoxal in a molecular proportion of 2.1.

Compounds of Formula 4 are obtained by treating those of Formula 9, suitably in a neutral to weakly acid aqueous medium, with formaldehyde or a substance generating formaldehyde and with urea, and if required etherifying the methylol compound.

By treating compounds of formula (12)

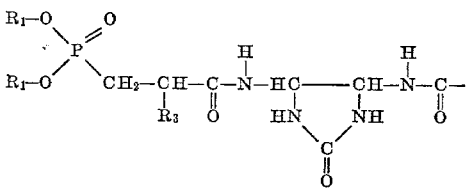

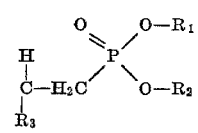

with formaldehyde or a substance generating formaldehyde, conveniently in an aqueous weakly alkaline medium, can be obtained the phosphonopropionamides of Formula 5 where R', R" and R''' denote hydrogen; the methylol groups in these compounds also may then be etherified. The starting materials of Formula 12 are obtained by heating a mixture of glyoxal monourein (4,5-dihydroxy-imidazolid-2-one) and a compound of Formula 11.

Compounds of Formula 11, and a method of preparing them, are known. They may be obtained by reaction of a phosphite ester of formula (13)

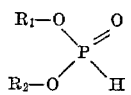

with acrylamide or methacrylamide in the presence of an alkaline catalyst.

The phosphorus containing reaction products of the present invention may be used as flame retardant agents for various substrates, e.g. wood or paper. They are particularly suited for flameproofing textiles, such as those from natural fibres, e.g. wool, and those from synthetic fibres, e.g. polyesters, polyamides or polyacrylonitrile, and especially those from native or regenerated cellulose such as cotton, artificial silk or rayon.

For this purpose there is used an aqueous composition containing a phosphorus containing reaction product of the present invention, which composition may further contain an aminoplast, especially a hardenable aminoplast precondensate such as a methylolmelamine, as well as an acid or potentially acid hardening catalyst. For the flameproofing treatment the amount of the phosphorus containing reaction product is suitably 20 to 40%, and that of the aminoplast is 3 to 10%, calculated on the weight of the textile fabric. The aqueous composition may be applied to the textile fabric by conventional means, e.g. by foularding. The fabric is then squeezed to the desired take-up, dried and subjected to a dry heat process at temperatures above 100° C., e.g. between 130 and 200° C. and advantageously between 150 and 180° C., the length of heating being shorter the higher the temperature used. If an aminoplast is not incorporated, it may be expedient to carry out the heat treatment at a pH of less than 3. The pH of the aqueous composition used to impregnate the fabric is conveniently brought below 3 by appropriate additives, e.g. phosphorus trichloride. Because the reaction medium is strongly acidic, it is necessary to wash the treated material with an acid-binding agent, e.g. sodium bicarbonate solution.

With the phosphorus containing reaction products, flameproofing finishes can be obtained which substantially withstand repeated washings without any undue reduction in the mechanical properties of the treated fabric. The phosphorus-containing reaction products have the advantage over other phosphorus-containing compounds generally, in that they impart a softer "handle" and improved crease-resistance to the cloth. The improved crease-resistance can be obtained even without addition of an aminoplast precondensate to the finishing preparation.

The following examples illustrate the invention. Unless otherwise specified, parts and percentages are by weight.

Example 1

In a reaction vessel (capacity 2500 parts by volume) fitted with a pH electrode are dissolved 1086 parts of 3-(dimethylphosphono)propionamide in 437 parts of 40% aqueous glyoxal solution and 1200 parts by volume of n-propanol with stirring at 30° C. Sodium bicarbonate (10 parts) is then added, the pH of the mixture rising to 7.3. The pH is then adjusted to 7.0 by adding a few drops of hydrochloric acid (24%) and the mixture is stirred for 5 days at room temperature. The pH increases to 7.7. At this time, the product has separated out. The mixture is cooled to 10° C., and the product is filtered off and dried in vacuo at 50° C. There is obtained a fine, white, strongly hygroscopic powder (351 parts) of melting point 156 to 159° C. On recrystallizing from methanol the product melts at 154 to 157° C. Analysis (e.g. presence of Amide II peak at 1550 cm.$^{-1}$ in the infra-red spectrum) shows the product to be of the formula (14)

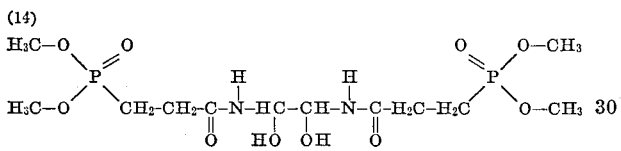

A portion (70 parts), which had not been recrystallised, of the compound of Formula 14 was dissolved in 27 parts of 37% aqueous formaldehyde and 17 parts of water and methylolated by treatment for 6 hours at pH 8 and 60° to 70° C. A yellow solution of 70% solids content is obtained. Of the formaldehyde employed, 45% is consumed, indicating the hydroxymethyl phosphonopropionamide probably having the formula (15)

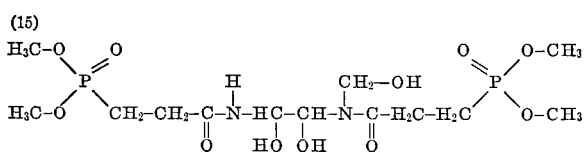

to have been formed.

Cellulose fibres could be rendered flameproof with this methylolamide.

Example 2

3-(dimethylphosphono)propionamide (543 parts) is dissolved by stirring at 30° C. with 218 parts of 40% aqueous glyoxal solution and 900 parts of anisole contained in a flask of capacity 1500 parts by volume and equipped with a pH electrode. The pH of the solution is adjusted to 7.0–7.1 and the solution is stirred for 4 days at room temperature. After the mixture has stood for 3 days, the anisole is separated off. The aqueous phase is concentrated in vacuo at 60° C. to constant weight. There is obtained a yellow, thick syrupy mass which slowly crystallises after a few days.

The product (105 parts) and urea (15 parts) are dissolved by stirring at room temperature in 61 parts of 37% aqueous formaldehyde in a vessel (capacity 200 parts by volume) provided with a pH electrode. The solution is adjusted to pH 5.5 with hydrochloric acid 24% and stirred for 2½ hours at 60° C. The mixture is then cooled to room temperature and brought to pH 7 with 30% aqueous sodium hydroxide. There is obtained a clear, yellow solution of low viscosity and having a solids content of 77%. Determination of the unconsumed form-aldehyde indicates formation in about 87% yield of the compound probably having the formula (16)

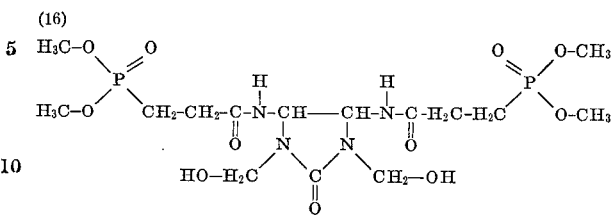

which compound was suitable for flameproofing cellulose fibres.

Example 3

Glyoxal monourein (59 parts) and 181 parts of 3-(dimethylphosphono)propionamide are heated to 115° C. in a vessel of capacity 500 parts by volume, and after a few minutes the melt is cooled to room temperature. Aqueous formaldehyde solution (37%, 162 parts) is then added, and the solution is adjusted to pH 9 with 30% sodium hydroxide. Methylolation is carried out by stirring at this pH for 6 hours at room temperature. There is obtained an orange-yellow, clear solution with a solids content of 73%. Determination of the free formaldehyde content indicates a 75% yield of a reaction product containing the trimethylol compound probably of the formula (17)

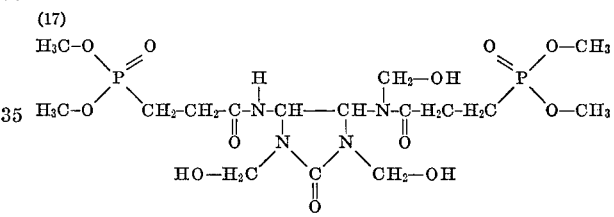

which product is suitable for flameproofing cellulosic fibres.

Example 4

In a reaction vessel (capacity 500 parts by volume) fitted with a pH electrode are dissolved 209 parts of 3-(dimethylphosphono)propionamide in 72.5 parts of a 40% aqueous glyoxal solution and 200 parts of n-propanol at 25° C. The pH of the solution is adjusted to 7.0 to 7.1 by adding sodium hydrogen carbonate, and the mixture is stirred for 4 days at room temperature. The pH increases to 9.5. The aqueous-propanolic phase is concentrated in vacuo. There are obtained 262 parts of a thick syrupy yellow product.

This product and 30 parts of urea are dissolved at 60° C. in 112.5 parts of 40% aqueous formaldehyde. At this temperature the solution is adjusted to pH 5.5 with 24% hydrochloric acid and stirred for 2½ hours at this temperature and pH. Analysis showed:

| | Parts |
|---|---|
| Total CH$_2$O | 39.1 |
| Free CH$_2$O | 12.5 |
| Bound CH$_2$O | 26.6 |

This result probably corresponds to an 89% methylolation of the two secondary NH-groups in the glyoxal monourein ring.

96 parts of methanol are now added to the reaction solution, which at the same time is cooled down to 40° C. Then the pH is adjusted to 4 to 4.5 by adding 24% hydrochloric acid. The etherification is carried out under these conditions for 25 minutes. Thereupon the pH is adjusted to 8 by the addition of 30% sodium hydroxide, and the unreacted methanol and partially also the water of the formaldehyde solution are removed in vacuo at 35 to 40° C.

367 parts of a yellow syrupy product with a solids content of 40% are obtained. This product contains a compound believed to have the formula

(18)
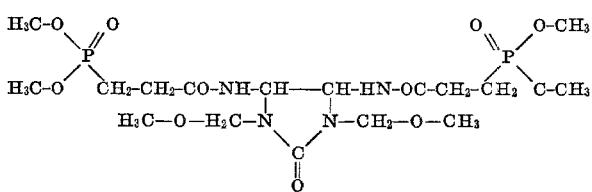

This product is useful for flameproofing cellulose fibres, and at the same time the crease-resistance of the so finished fabric can be improved.

Example 5

(1) In a reaction vessel (capacity 500 parts by volume) fitted with a pH electrode are dissolved 90.5 parts of 3-(dimethylphosphono)propionamide and 59 parts of glyoxal monourein in 200 parts of water. The pH of the solution is adjusted to 5.0 to 5.5 by the addition of 24% hydrochloric acid and the temperature raised to 60° C. After stirring for 2 hours at this temperature the water is removed at 60° C. in vacuo. The residue is stirred with 500 parts of absolute ethanol and cooled down to 5° C. The precipitated white powder is filtered off and the filtrate is evaporated at 40° C. in vacuo to constant weight.

127 parts of a clear, yellow syrup are obtained.

Analysis of this syrup shows these results:

Calculated (percent): P, 11.0; N, 14.94. Found (percent): P, 11.5; N, 12.2.

This product thus corresponds to this formula

(19)
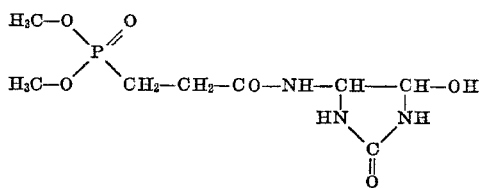

(2) In a reaction vessel (capacity 200 parts by volume) fitted with a pH electrode are dissolved 53 parts (0.188 mole) of the product of Formula 19 and 40 parts (0.188 mole) of 3 - (diethylphosphono)-propionamide in 100 parts of water. The pH is adjusted to 4.5 to 5 by the addition of 24% hydrochloric acid and the solution is kept at 60° C. with stirring for 2 hours. Then the pH is raised to 7.5 by the addition of a 30% sodium hydroxide solution. The water is removed in vacuo at 40° C.

91.5 parts of this reaction product are stirred in the same reaction vessel with 58 parts of y 40% aqueous formaldehyde solution and the pH is adjusted to 10 to 10.5 by the addition of a 30% sodium hydroxide solution. In this manner the product is methylolated at 25 to 30° C. for 24 hours. Analysis showed the formaldehyde to be present as:

Parts
Total CH₂O _____ 22.7
Free CH₂O _____ 4.6
Bound CH₂O _____ 18.1

This suggests formation of a trimethylol compound of the formula

(20)
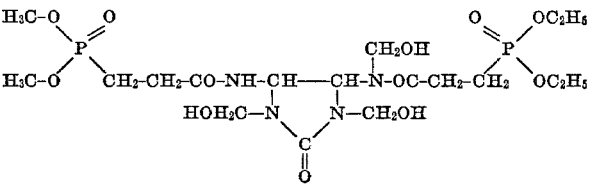

Yield: 150 parts of a yellow, clear syrupy solution which has a solids content of 73.5%.

Example 6

In a reaction vessel (capacity 750 parts by volume) fitted with a pH electrode are dissolved 59 parts of glyoxal monourein and 181 parts of 3 - (dimethylphosphono) propionamide in 200 parts of water and with stirring warmed up to 60° C. After adjusting the pH to 5 by the addition of 24% hydrochloric acid, the mixture is stirred for 2 hours at 60° C. Then the mixture is cooled down to 25° C., 150 parts of 40% aqueous formaldehyde are added and the pH is adjusted to 10 to 10.5 by the addition of sodium hydroxide solution 30%. The methylolation is carried out at room temperature, at the beginning however the temperature temporarily rises to 40° C. After 4 hours reaction time the formaldehyde was found to be present as:

Parts
Total CH₂O _____ 57.3
Free CH₂O _____ 4.9
Bound CH₂O _____ 52.4

This means that 91.4% of the formaldehyde is chemically bound to the reaction product.

To this product are added 150 parts of methanol at room temperature. The mixture is warmed up to 40° C. and the pH is adjusted to 4 to 4.5 by the addition of hydrochloric acid (24%).

The product is etherified for 25 minutes under these conditions. Then the pH is adjusted to 8 by the addition of a 30% sodium hydroxide solution. The unreacted methanol and to a great extent also the water are removed in vacuo at 35 to 40° C.

327 parts of a clear, yellow syrup are obtained having a solids content of 94.7%.

This product is excellent for permanent flameproofing cellulose fibres. At the same time the crease-resistance can be considerably improved. This product can be fixed on cellulose fibres without the aid of an aminoplast precondensate.

Example 7

In a reaction vessel (capacity 200 parts by volume) fitted with a pH electrode are dissolved 105 parts of the compound of the Formula 14 described in Example 1 in 37.5 parts of a 40% aqueous formaldehyde solution. The pH is adjusted by the addition of 30% sodium hydroxide at room temperature. The methylolation lasts 20 hours. The suspension which is formed at the end is kept at 70° C. for 10 minutes, whereupon an opaque solution is formed. The formaldehyde was shown to be present as:

Parts
Total CH₂O _____ 13.95
Free CH₂O _____ 8.9
Bound CH₂O _____ 5.05

This corresponds to a 67.3% yield of the monomethylol compound.

To the above solution are added 32 parts of methanol and the temperature is raised to 40° C. The pH is adjusted to 4 to 4.5 by the addition of 24% hydrochloric acid. Under these conditions the etherification is carried out for 25 minutes The pH is then adjusted to 8 by the addition of sodium hydroxide 30%. The untreated methanol and partially the water are removed in vacuo at 35 to 40° C. 141 parts of a yellow syrup are obtained having a solids content of 88.5% and containing the compound of formula

(21)
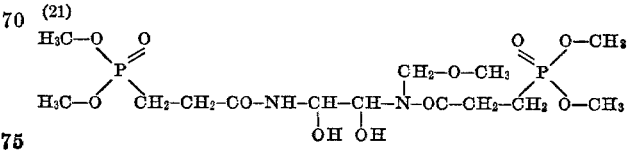

This product imparts to cellulose fibres a flame-proof finish which resists an alkaline wash at 60° C.

Example 8

As described in Example 1, 2 moles of 3-(diethylphosphono)-α-methylpropionamide and 1 mole of glyoxal are jointly reacted in n-propanol for 24 hours at 25° C. The pH of the mixture is kept above 7 by the addition of a 30% sodium hydroxide solution. This reaction product is reacted with 1 mole of formaldehyde for 6 hours at a pH of 8 and at 60° C. as described in Example 1. 0.8 mole, or 80% of the formaldehyde, is consumed. The methylolated reaction product is dried in vacuo at 50° C. to constant weight. 220 parts of a dark product with a yield of 80.6% are obtained, containing the compound of formula (22)

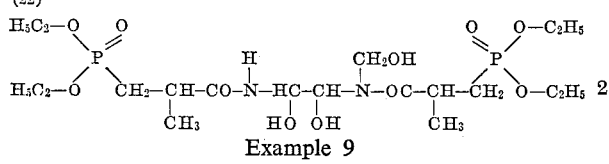

Example 9

As described in Example 1, 2 moles of 3-(dimethylphosphono)propionamide and 1 mole of glyoxal are reacted together in n-propanol at 25° C. for 60 hours. The reaction product, corresponding to Formula 14 is reacted with 1 mole of freshly prepared dimethylol urea. The pH is adjusted to 5.5 and the mixture is kept at 60° C. for 2½ hours. Upon this the pH is raised to 7 and the volatile components are removed in vacuo at 50° C. The yield is 63.5% and the end product contains the compound probably having the Formula 16.

Example 10

A cotton fabric (serge) is foularded with one of the aqueous liquors A, B, C, D or E, shown in the following table.

|  | Grams per litre | | | | |
|---|---|---|---|---|---|
|  | A | B | C | D | E |
| 70% Solution of compound of postulated Formula 15 | 572 | | | | |
| Product of Example 2 | | 600 | 600 | | |
| Product of Example 3 | | | | 700 | 700 |
| Ammonium chloride | 4 | 4 | 4 | 4 | 4 |
| 60% aqueous solution of a pentamethylol-melamine-methyl ether containing on average 2.5 etherified methylol groups | 85 | 85 | | 85 | |

The cloth is padded to 100% expression, dried for 15–30 minutes at 130° C. and cured at 160° C., for 4½ minutes. The cloth is then washed for 5 minutes at 60° C. in a solution containing 2 g. of anhydrous sodium carbonate per litre of water, and dried. Despite the treatment with the phosphonopropionamide, the cloth retained its soft handle, while the flameproofing effect persisted after five washes at the boil in a bath containing 2 g. sodium carbonate and 5 g. soap per litre of water.

Example 11

A mercerised cotton fabric (150 g./m.²) is foularded with one of the aqueous preparations shown in the following table (80% liquor uptake):

| | Preparation Numbers [1] | | | | | | |
|---|---|---|---|---|---|---|---|
| | I | II | III | IV | V | VI | VII |
| Reaction product (100%) of Example: | | | | | | | |
| 4 | 500 | | | | | | |
| 5 | | 580 | 580 | | | | |
| 6 | | | | 460 | 460 | | |
| 7 | | | | | | 400 | 400 |
| Pentamethylolmelamine: dimethylether (60%) | 80 | | 80 | | 80 | | |
| NH₄Cl | | 4 | 4 | 4 | 4 | 4 | 4 |
| Mg(BF₄)₂ | 7.5 | | | | | | |
| pH of the preparations | 4.0 | 4.4 | 4.7 | 5.3 | 5.4 | 4.9 | 4.9 |

[1] The amounts of each component are given in parts by weight p 1,000 parts by weight of the preparation.

After the foularding the fabric is dried at 80° C. and cured at 160° C. for 10 minutes. The fabric is then washed for 5 minutes at boiling temperature in a solution containing 2 g. of anhydrous sodium carbonate per litre of water, rinsed and dried.

The fabrics are then tested in respect of their flame-resistance, crease-resistance and tensile strength. The results of these tests are listed in the following table:

| Test | Untreated | Treated with preparation Number | | | | | | |
|---|---|---|---|---|---|---|---|---|
| | | I | II | III | IV | V | VI | VII |
| Flame resistance [1] as such: | | | | | | | | |
| Burning time (sec.) | Burns | 0 | 0 | 0 | 0 | 0 | 0 | 0 |
| Char length (cm.) | | 11.5 | 9.0 | 11.0 | 9.5 | 10.5 | 10.5 | 10.5 |
| After 5× SNV [2]-4-wash: | | | | | | | | |
| Burning time (sec.) | Burns | 0 | 0 | 0 | 0 | 1 | Burns | Burns |
| Char length (cm.) | | 10.5 | 9.5 | 10.5 | 10.0 | 10.5 | | |
| Crease angle: | | | | | | | | |
| Dry | 72 | 115 | 121 | 110 | 129 | 122 | 91 | 83 |
| Wet | 61 | 127 | 122 | 113 | 121 | 123 | 102 | 87 |
| Tensile strength: [3] | | | | | | | | |
| Kg./2.5 cm | 25.1 | 23.8 | 24.5 | 22 | 21.8 | 20.8 | 25.2 | 24.6 |
| Percent | 100 | 95 | 98 | 88 | 87 | 83 | 100 | 98 |

[1] Vertical test according to DIN 53906.
[2] SNV=Standard of the "Schweizerischer Normenverband" (Swiss Standards Institution).
[3] Breaking load according to SNV-98461 measured in the direction of the warp.

Alongside a good and generally permanent flame-resistance, preparations I to VII also yield a good crease-resistance, even without the addition of an aminoplast precondensate to the finishing bath. The mechanical properties of the fabrics are not impaired or only very little by the present flameproof finishes. The tensile strength is decreased only very little. In addition the hand of the finished fabric as compared to the hand of an untreated fabric is practically unchanged.

We claim:
1. A product of the formula

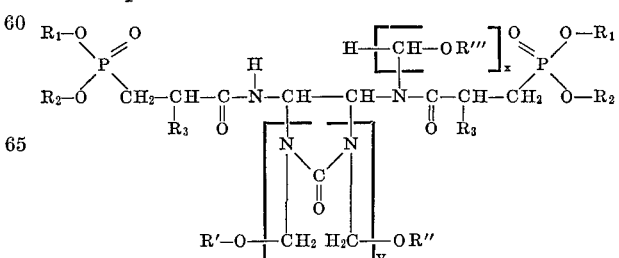

in which $R_1$ and $R_2$ each denote alkyl of 1 to 4 carbon atoms, chloroalkyl of 1 to 4 carbon atoms or allyl, $R'$, $R''$, $R'''$ each denote a hydrogen atom, an alkyl of 1 to 4 carbon atoms or allyl, $R_3$ denotes a hydrogen or methyl, $x$ and $y$ are each 0 or 1, at least one of $x$ and $y$ being 1.

2. The product according to claim 1, wherein $R_1$ and $R_2$ each denote methyl or ethyl.

3. The product according to claim 1 wherein $R_3$ is a hydrogen atom.

4. The product according to claim 1 wherein R', R" and R'" each denote hydrogen or methyl.

5. The product according to claim 1 wherein $y$ is 0 and $x$ is 1.

6. The product according to claim 1 wherein $y$ is 1 and $x$ is 0.

7. The product according to claim 1 wherein both $x$ and $y$ are each 1.

8. The product according to claim 1 of the formula

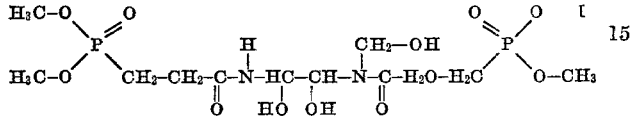

9. The product according to claim 1 of the formula

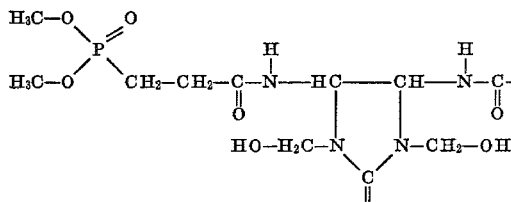

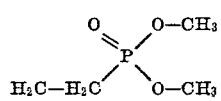

10. The product according to claim 1 of the formula

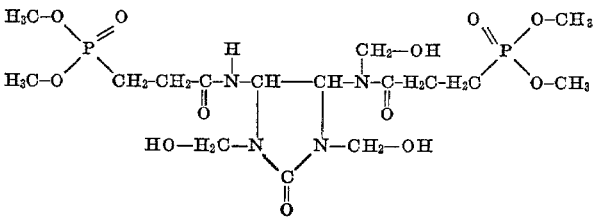

References Cited
UNITED STATES PATENTS
3,351,617  11/1967  Jaeger et al. _____ 260—78.5

HENRY R. JILES, Primary Examiner
G. T. TODD, Assistant Examiner

U.S. Cl. X.R.
260—932, 943; 117—136

D

CASE ARL-137/E

PO-1050
(5/69)

UNITED STATES PATENT OFFICE
CERTIFICATE OF CORRECTION

Patent No. 3,579,532      Dated May 18, 1971

Inventor(s) HERMANN NACHBUR ET AL

It is certified that error appears in the above-identified patent and that said Letters Patent are hereby corrected as shown below:

Column 10, lines 65-70, the lower portion of the formula should read:

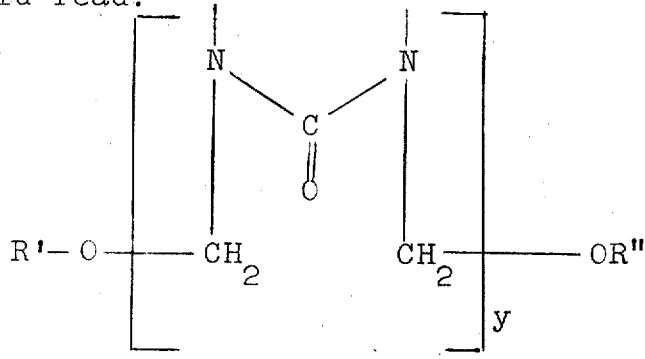

Column 11, lines 14-19, the right-hand side of the formula should read:

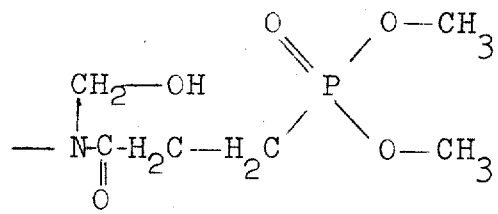

Signed and sealed this 29th day of February 1972.

(SEAL)
Attest:

EDWARD M. FLETCHER, JR.
Attesting Officer

ROBERT GOTTSCHALK
Commissioner of Patents